F. F. STRATTON.
CHANGE SPEED GEARING AND MOTOR CONTROL.
APPLICATION FILED AUG. 16, 1912.
1,149,419.
Patented Aug. 10, 1915.
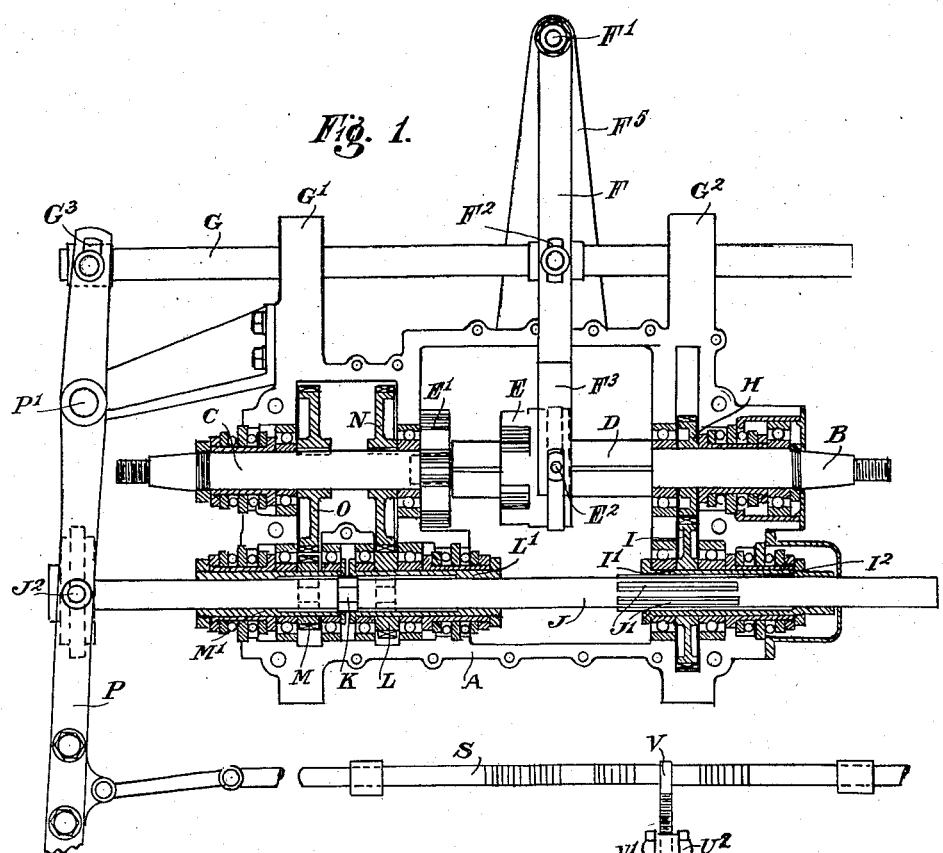
Fig. 1.
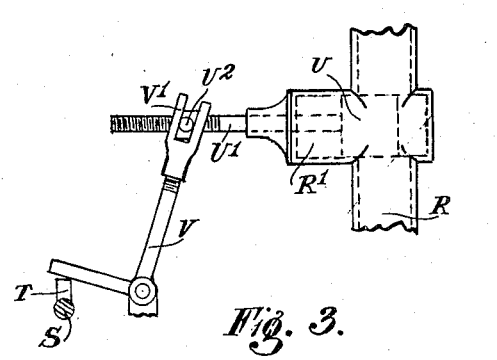
Fig. 3.
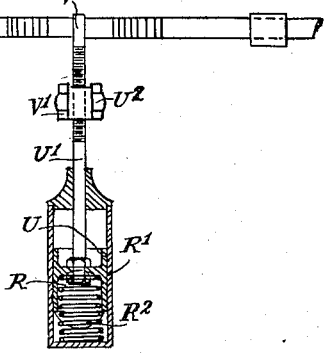
Fig. 2.
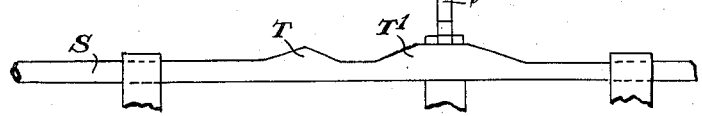

UNITED STATES PATENT OFFICE.

FENTON FREDERICK STRATTON, OF EAST CROYDON, ENGLAND.

CHANGE-SPEED GEARING AND MOTOR CONTROL.

1,149,419.   Specification of Letters Patent.   Patented Aug. 10, 1915.

Application filed August 16, 1912. Serial No. 715,358.

*To all whom it may concern:*

Be it known that I, FENTON FREDERICK STRATTON, a subject of the King of Great Britain, and a resident of Oak Lodge, Park Hill road, East Croydon, Surrey, England, have invented new and useful Improvements in Change-Speed Gearing and Motor Control, of which the following is the specification.

This invention relates to the change speed and control of the motor in motor vehicles.

The object of this invention is to provide such an improved construction and arrangement of the gear box in a motor vehicle and of its operating mechanism co-acting or combined with improved controlling mechanism of the engine in particular the throttle valve, that a simpler, more effective and a quicker control of the engine can be obtained, such simpler control being effected by an improved arrangement of co-acting or coöperating parts by which the change of speed and a reduction of the speed of the engine are caused simultaneously by one lever. The said operation by one lever may also effect a more silent control, since the arrangement prevents any racing of the engine when the change is made. And in order that my invention may be completely understood, reference should be made to the accompanying sheet of drawings.

Figure 1 is a sectional plan of the gear box and the said operating lever and co-acting parts. Fig. 2 is a profile of the cam rod shown in Fig. 1. Fig. 3 is a view of the throttle lever with the cam rod in section.

A is the gear box casing, the upper part removed.

B is the engine or driving shaft and C is the driven shaft of the gearing for transmitting the power to the driving wheels of the vehicle. The engine shaft end is formed with a projection loosely fitting within a recess in the driven shaft to keep them in alinement. The end of the shaft B is provided with flat surfaces D upon its external face forming a square or rectangular portion, upon which the one portion of the jaw clutch E is adapted to slide to engage the other portion $E^1$. The part $E^1$ is rigidly secured to the driven or power shaft C. The jaw clutch E is operated by means of the lever F pivoted at $F^1$ on a bracket $F^5$ fixed to the box. The lever is provided with a slot $F^2$ adapted to engage a pin or pins secured to the rod or shaft G. The shaft G slides longitudinally in extensions $G^1$ $G^2$ formed integrally with the box. The lever F passes through a slot in the upper portion of the box or casing A, and is provided at its inner end with a fork $F^3$. Slots are formed at the end of each prong of the said fork in which are adapted to slide the pins $E^2$ suitably secured to the sliding portion of the clutch E. The pins $E^2$, one of which shows, are formed integrally with the ring which surrounds and fits within a groove in the clutch portion E.

The gear wheel H is keyed to the shaft B, and is always in mesh with the gear wheel I, which is mounted upon and fixed to the sleeve $I^1$. The sleeve is adapted to rotate the shaft J by means of the feathers $J^1$ which may be formed integrally with the shaft. The feathers $J^1$ are adapted to engage a sliding fit with recesses or featherways $I^2$ formed in the inner surface of the sleeve $I^1$. The featherways are of such length that they continuously engage the feathers $J^1$ at both ends of the longitudinal stroke or movement of the shaft J. The said sliding movement is effected by means of the lever P fulcrumed at $P^1$ on a bracket secured to the box. The shaft J is jointed to the lever P by the pin $J^2$. The pin $J^2$ is formed integrally with a ring surrounding the collar which is secured to the shaft J, so as to permit the arc of movement of the lever P, which lever is operated directly by the hand operating lever by the side of the driver. The shaft J is also provided with flats projecting above its external face forming a hexagonal section K. The hexagon portion K is preferably formed integrally with the shaft J. The hexagon K is adapted in sliding with the shaft J longitudinally to engage in one position with a correspondingly formed hexagonal portion $L^1$ projecting from the internal surface of the sleeve of the gear wheel L. The spur wheel L is in continuous engagement with the wheel N and when the hexagon K engages the gear wheel L, the shaft C is driven through the wheel N at the slow forward speed.

When the shaft J is moved to the end of its stroke and the hexagon K does not engage either gear wheel, the gear wheels M, O, L, N, rotate idly as shown in Fig. 1. In this position the clutch part E is brought into engagement with the part E¹, by the lever F. The shaft C is then driven directly through the jaw clutch E, and the transmission is at engine speed. The lever P is jointed or connected to the sliding rod G by means of the pin and slot G³. In a third or reverse position of the gearing, the hexagonal portion K engages a correspondingly formed portion M¹ projecting in like manner from the internal face of the sleeve of the gear wheel M. The reverse gearing is of ordinary form and construction, it consists of one intermediate pinion always in mesh with the spur wheels O and M. This intermediate pinion is not shown.

Referring to Figs. 1 and 3, R is the throttle pipe of the engine, and R¹ is a cylindrical part formed at right angles to the pipe. A piston or slide U operated by means of a rod U¹ is adapted to slide within the cylinder R¹ in such manner as to vary the amount of gas drawn through the throttle pipe R, the piston being returned to its normal position by the spring R². To the rod U¹ are secured the pins U² which engage within the slotted or forked piece V¹ of the bell crank lever V. The said lever is operated by cams T T¹. The cams T T¹ may be formed integrally or otherwise suitably secured to the shaft or rod S which is attached by means of a link or the like to the lever P, in such manner as to cause the cams to operate simultaneously with the rods or shafts J and G. By this means the volume of gas passing through the throttle pipe R is reduced when the shaft J is in the free or neutral position, in order to prevent undue wear of the engine through racing when no power is being transmitted to the driving wheels of the vehicle. This reduction of speed reduces the wear and stresses upon the change speed gearing, as changes of gear only take place when the speed and power of the engine has been reduced.

In the improved gearing the necessary slip is provided by the usual clutch fitted in the ordinary manner next the engine or in combination with it.

It will be observed that chain and sprocket wheels may be employed in place of the spur gearing as all gears are always in mesh.

What I do claim as my invention and desire to secure by Letters Patent is:—

1. The combination with an engine of variable speed and a change speed transmission mechanism including a clutch, of means for progressively regulating the speed of the engine, the regulating means having an operative connection with the actuating means of the speed transmission mechanism whereby both members of the clutch are at approximately the same speed at the moment of engaging the teeth for changing.

2. The combination with an engine of variable speed and a change speed transmission mechanism including a clutch, of means for progressively regulating the speed of the engine through the control of the engine throttle, the speed regulating means for the engine having an operative connection with the change speed transmission whereby both members of the clutch are at approximately the same speed at the moment of engaging the teeth for changing.

3. The combination with an engine and a change speed transmission gearing including a reciprocating actuating bar, of means for regulating the speed and power of the engine to effect a reduction in the speed thereof while effecting gear changes in the change speed transmission gearing and for increasing the speed of the engine after each gear change has been made, said means including a throttle valve, a cam actuating said valve and a positive link connection between the reciprocating actuating bar of the change speed gearing and the said cam.

4. In a device of the character described, a change speed gearing comprising a gear casing, a driving shaft journaled in said casing, a driven shaft journaled in said casing in alinement with said driving shaft, a clutch for coupling said driving and driven shafts, a shaft longitudinally movable in said gear casing, independent sets of gearing between said driven shaft and said longitudinally movable shaft including a pair of gears rotatably supported in said gear casing and slidably engaging said longitudinally movable shaft, said pair of gears and said longitudinally movable shaft being provided with coöperating portions whereby said longitudinally movable shaft may, when shifted, be coupled to either of said pair of gears or be moved to a neutral position when it is out of engagement with both of said pair of gears, an engine cut off, and means for operating said engine cut off when the longitudinally movable shaft is moved to its neutral position.

5. The combination with an engine, a change speed gearing and controlling means therefor, of means for effecting a reduction of the speed of the engine while effecting gear changes in the change speed transmission gearing and for increasing the speed and power of the engine after each gear change, said means being operatively connected with and controlled by the controlling means of the change speed transmission gearing.

6. The combination with an engine of variable speed and a speed change transmission mechanism, of means for progressively regulating the speed of the engine through the control of the engine throttle, the speed regulating means of the engine having an operative connection with the change speed transmission, whereby the power is increased coincidently with the bringing into operation of the transmission gear and power is a minimum until said gear is brought into operation.

FENTON FREDERICK STRATTON.

Witnesses:
  I. D. Roots,
  H. D. Jamison.